Oct. 6, 1970     G. G. LANDBERG     3,532,327
DRAFT TUBE ARRANGEMENT FOR STARTING-UP AND SETTLED SOLIDS
Filed June 28, 1968
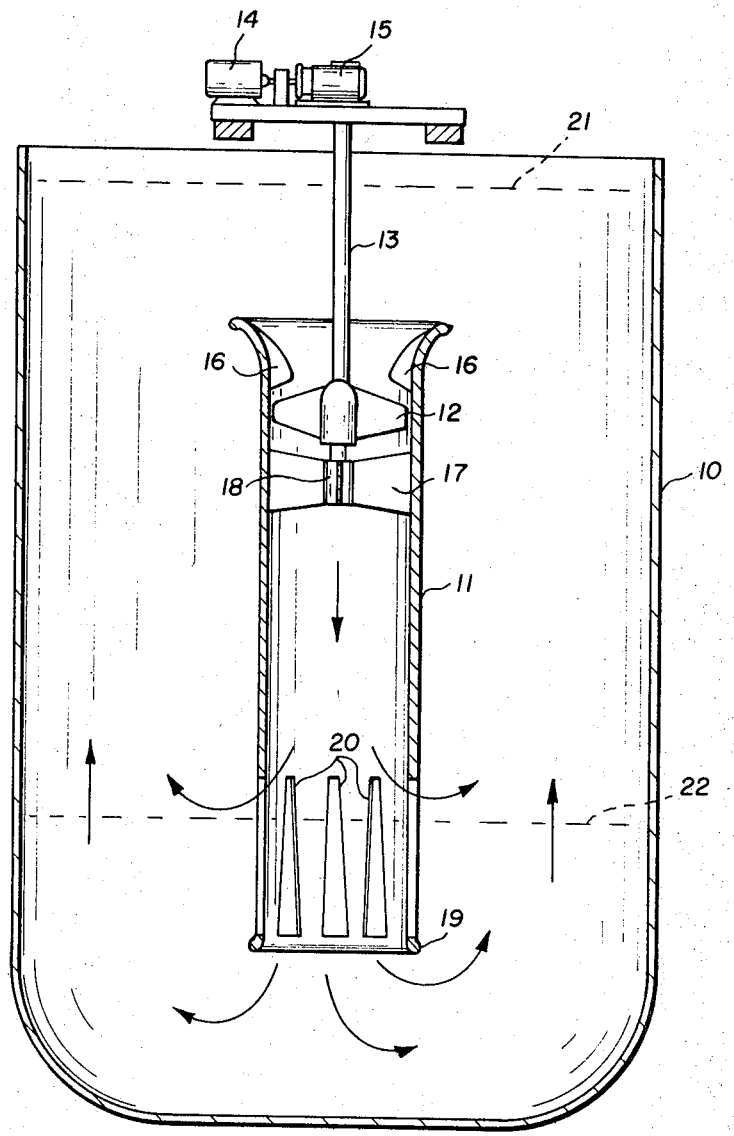
GEORGE G. LANDBERG
INVENTOR.
BY Cumpston, Shaw
& Stephens
ATTORNEYS

United States Patent Office 3,532,327
Patented Oct. 6, 1970

3,532,327
DRAFT TUBE ARRANGEMENT FOR STARTING-UP AND SETTLED SOLIDS
George G. Landberg, 85 Wendover Road,
Rochester, N.Y. 14610
Filed June 28, 1968, Ser. No. 741,088
Int. Cl. B01f 5/12
U.S. Cl. 259—95
2 Claims

ABSTRACT OF THE DISCLOSURE

In a tank for processing liquid and solid material, a draft tube is arranged to extend below the level to which solids may settle and is provided with a down-pumping impeller near its top, flow control vanes near the impeller, and vertical slots extending from the bottom rim of the tube to above the level to which solids may settle to allow startup in settled solids by liquid passing through the tops of the slots for scouring away and suspending the solid material in the region of the slots.

---

This invention relates to a draft tube arrangement for starting-up in settled solids.

Many processes require suspension of solid particles in a liquid within a tank, and a draft tube arranged in the tank is commonly used to accomplish this. An impeller can pump either up or down through the draft tube and can be arranged at various levels within the tube for producing a flow of liquid that effectively keeps the solid particles in suspension.

Various circumstances occassionally require that such a process be shut down, and this allows the solid particles to settle to the bottom of the tank. Draft tubes often extend deeply enough into the tank so that their lower ends are submerged in settled solids after shut-down, and the impeller often cannot be started with settled solids clogging the lower end of the tube.

Prior art methods of coping with this include draining the tank and shoveling out the solid material to clear away the bottom of the draft tube, refilling the tank with liquid, starting the impeller, and adding solids. Another method is to arrange pipes extending into the bottom of the tank into the region of the bottom of the tube and to force compressed air through the pipes to agitate and loosen the settled solids so liquid can move through the solid material to begin scouring away and suspending the particles. Another solution is not to extend the draft tube down below the level of settled solids. All of these alternatives have serious disadvantages in addition to the time and expense of shut-down, burdening the process with a less than optimum draft tube, or requiring expensive auxiliary equipment.

The objects of the invention include, without limitation:

(a) Overcoming the disadvantages of prior art draft tube arrangements relative to start-up in settled solids;

(b) Using a simple, economical and effective draft tube arrangement allowing start-up in settled solids without requiring any special operations; and (c) Arranging a draft tube for optimum operating efficiency in a way that allows start-up in settled solids and protects the draft tube and associated equipment at all times.

These other objects of the invention will be apparent hereinafter from the specification which describes the invention, its use, operation, and preferred embodiment, from the drawing, which constitutes a part of the disclosure, and from the subject matter claimed.

Generally, the inventive draft tube arrangement includes: a tank with a vertical draft tube below the operating liquid level and extending substantially below the level of settled solids in the tank; an impeller near the top of the tube driven for pumping downward through the tube; generally vertical flow control vanes inside the tube near the impeller; a rim around the bottom of the tube; and the wall of the tube above the rim having vertical slots extending continuously from the rim upward to above the level of settled solids.

The drawing shows a partially schematic vertical cross-sectional view of a preferred embodiment of a draft tube arranged according to the invention. Those skilled in the art will appreciate that other embodiments and variations can be made within the spirit of the invention.

Tank 10 in operation, contains liquid in which solid material is suspended. A vertical draft tube 11 is arranged at the center of tank 10, and impeller 12 is disposed near the top of tube 11 on shaft 13. Motor 14 and gear drive 15 turn shaft 13 so that impeller 12 pumps liquid material downward through draft tube 11 as shown by the arrows. Vanes 16 above impeller 12 guide liquid material downward to impeller 12. The lower end of shaft 13 below impeller 12 is housed in a steady rest or bearing 18, and generally vertical vanes 17 extend from bearing 18 to the wall of tube 11 for guiding pumped liquid downward through tube 11 with minimum swirling.

A rim 19 is formed around the bottom of tube 11, and a plurality of slots 20 are formed in the wall of tube 11 above rim 19. The normal operating liquid level within tank 10 is shown at line 21 and line 22 indicates the level of settled solid material in tank 10 if settling is allowed to occur. Of course, in normal operation, solid material is suspended in the liquid in tank 10, and level 22 is discernible only after shutdown has allowed the solid material to settle.

In operation, tank 10 is filled with a charge of liquid and solid material and impeller 12 is driven to force a jet stream of liquid downward through the inside of tube 11 toward the bottom of tank 10 where it is deflected and turned upward in a flow rising around the wall of tank 10. This scours away and maintains the liquid suspension of the solid materials tending to settle in tank 10. At the level of the top of tube 11, liquid with its suspended solid material turns inward and is pumped down through tube 11 in continuous circulation within tank 10.

The lower rim 19 of tube 11 extends well below the level 22 of settled solids, and slots 20 extend from rim 19 upward to above level 22. The bottom of tube 11 is thus submerged in solid material when solids have settled after a shut-down.

A start-up in settled solids is accomplished merely by turning on motor 14 to drive impeller 12. Liquid material forced downward in tube 11 escapes through the upper portions of slots 20 and flows outward over the upper surface 22 of the settled solids. Such flow gradually scours away the settled solids and suspends them in the moving liquid. As pumping continues, the scouring away of solids forms grooves or valleys extending radially outward from each slot 20, and the open portion of each slot gradually lowers as paths are eroded more deeply into the settled solids. Eventually, slots 20 are clear all the way to their bottoms adjacent rim 19, and liquid begins to pass under the bottom of rim 19 and begins scouring away settled solids below tube 11. Moving liquid then flows widely over the bottom of tank 10 and begins to erode the ridges left between the scoured valleys adjacent slots 20 for gradually clearing away and resuspending all the settled material.

Depending upon parameters such as the area of tube 11, the area of tank 10, the liquid and solid material involved, and the pumping rate of impeller 12, slots 20 are arranged to extend above settled solid level 22 for a sufficient area to allow automatic start-up and provide the desired scouring away and clearing of the settled solids at the bottom of tank 10.

Generally, several slots are preferred, and their number is preferably increased as the size of draft tube 11 and tank 10 increases. Also, slots 20 are preferably tapered as illustrated with wider bottoms and narrower tops so that the least resistance to liquid flow is at the bottom of slot 20. This encourages minimum passage of liquid through the upper portions of slots 20 during normal operation with all solids suspended, because the liquid jet downward from impeller 12 tends to tarvel a considerable distance before diverging appreciably, and because the least resisance to its divergence is at the broad bottoms of the slots 20. The inventive arrangement does not impair the normal operation of draft tube 11.

Another advantage of slots 20 is that they equalize pressure inside and outside tube 11. This is important in filling tank 10 before start-up when settled solids rise sufficiently to clog the bottom of tube 11. If solids are suspended in the liquid outside tube 11 while clear liquid is inside tube 11, the greater specific garvity of the outside liquid may press inward on tube 11 with sufficient force to damage it. Slots 20 affords a liquid communication to equalize the pressure inside and outside draft tube 11 to prevent its collapse from such inward forces. This is especially important for the larger, more expensive draft tubes that can withstand outward pressure but cannot resist substantial inward pressure.

Thus it will be seen that the invention draft tube arrangement accomplishes its stated objects in protecting a draft tube, allowing it to operate with optimum efficiency, and providing for start-up in settled solids without any extra operations or expense.

Persons wishing to practice the invention should remember that other embodiments and variations can be adapted to particular circumstances. Even though one point of view is necessarily chosen in describing and claiming the invention, this should not inhibit broader or related applications within the spirit of the invention.

I claim:
1. A draft tube arrangement for starting-up in settled solids, said arrangement comprising:
   (a) a tank for containing liquid and solid material;
   (b) a generally vertical draft tube fixed in said tank below the operating liquid level and extending down to substantially below the level of settled solids in said tank;
   (c) an impeller disposed in said draft tube in the region of the top thereof;
   (d) means for rotating said impeller for pumping downward inside said draft tube;
   (e) generally vertical flow control vanes arranged inside said draft tube in the region of said impeller;
   (f) a rim formed in the bottom of the wall of said draft tube;
   (g) said wall of said draft tube above said rim being formed to provide a plurality of generally vertical slots; and
   (h) said slots extending substantially continuously from the region of said rim upward to above said level of said settled solids.

2. The arrangement of claim 1 wherein said slots are wider at their bottoms than at their tops.

References Cited

UNITED STATES PATENTS

| | | | |
|---|---|---|---|
| 884,610 | 4/1908 | Rateau | 259—97 |
| 1,055,475 | 3/1913 | Ponndor | 259—97 |
| 1,733,244 | 10/1929 | Smith | 259—97 |
| 2,421,191 | 5/1947 | Durdin | 259—97 |

FOREIGN PATENTS

| | | |
|---|---|---|
| 366,166 | 1/1963 | Switzerland. |

ROBERT W. JENKINS, Primary Examiner